Feb. 20, 1934. H. AHOLA 1,947,448
BEVEL GAUGE
Filed April 26, 1932 2 Sheets-Sheet 2
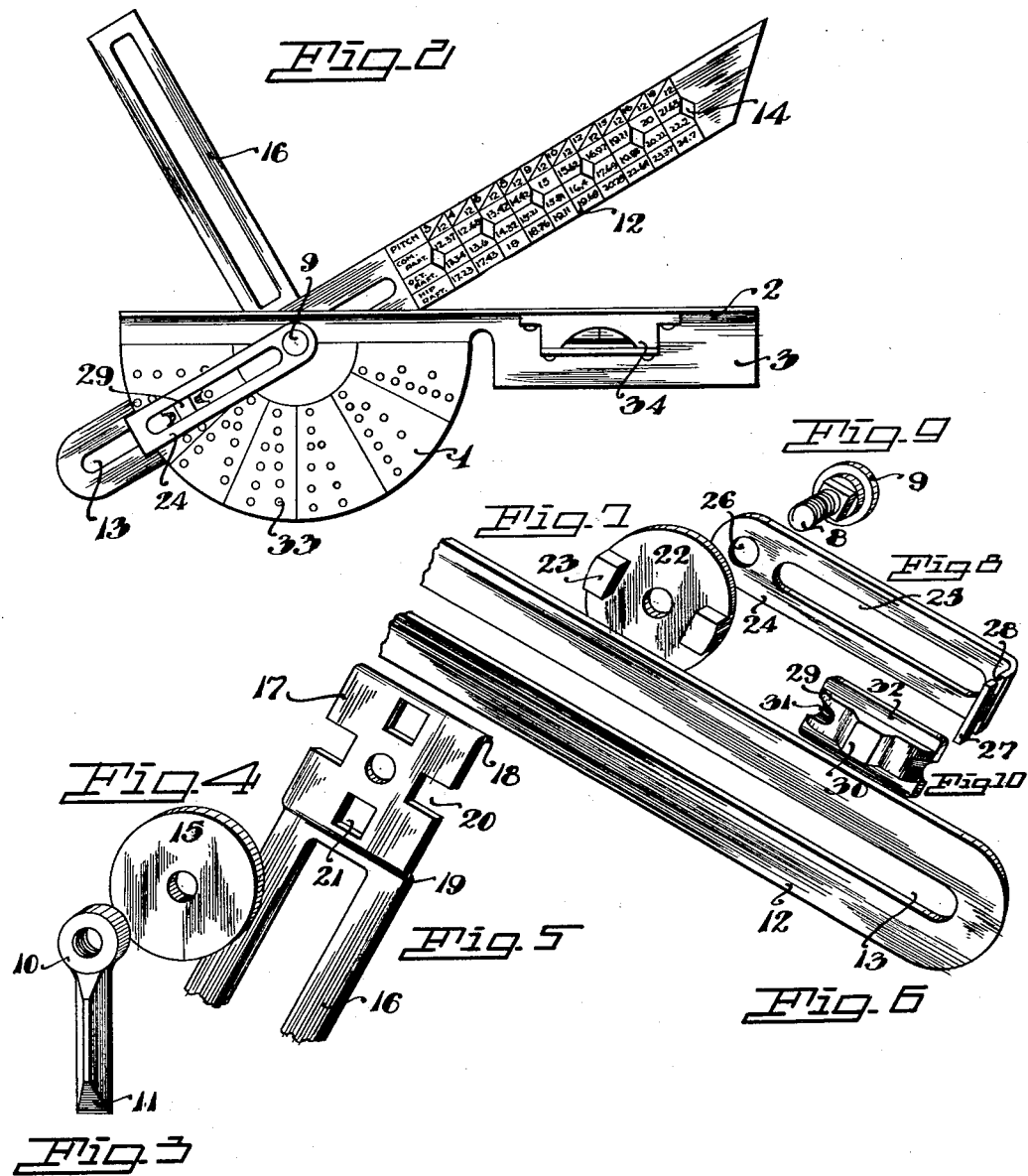
Harold Ahola
Inventor
By Herbert E. Smith
Attorney Patented Feb. 20, 1934

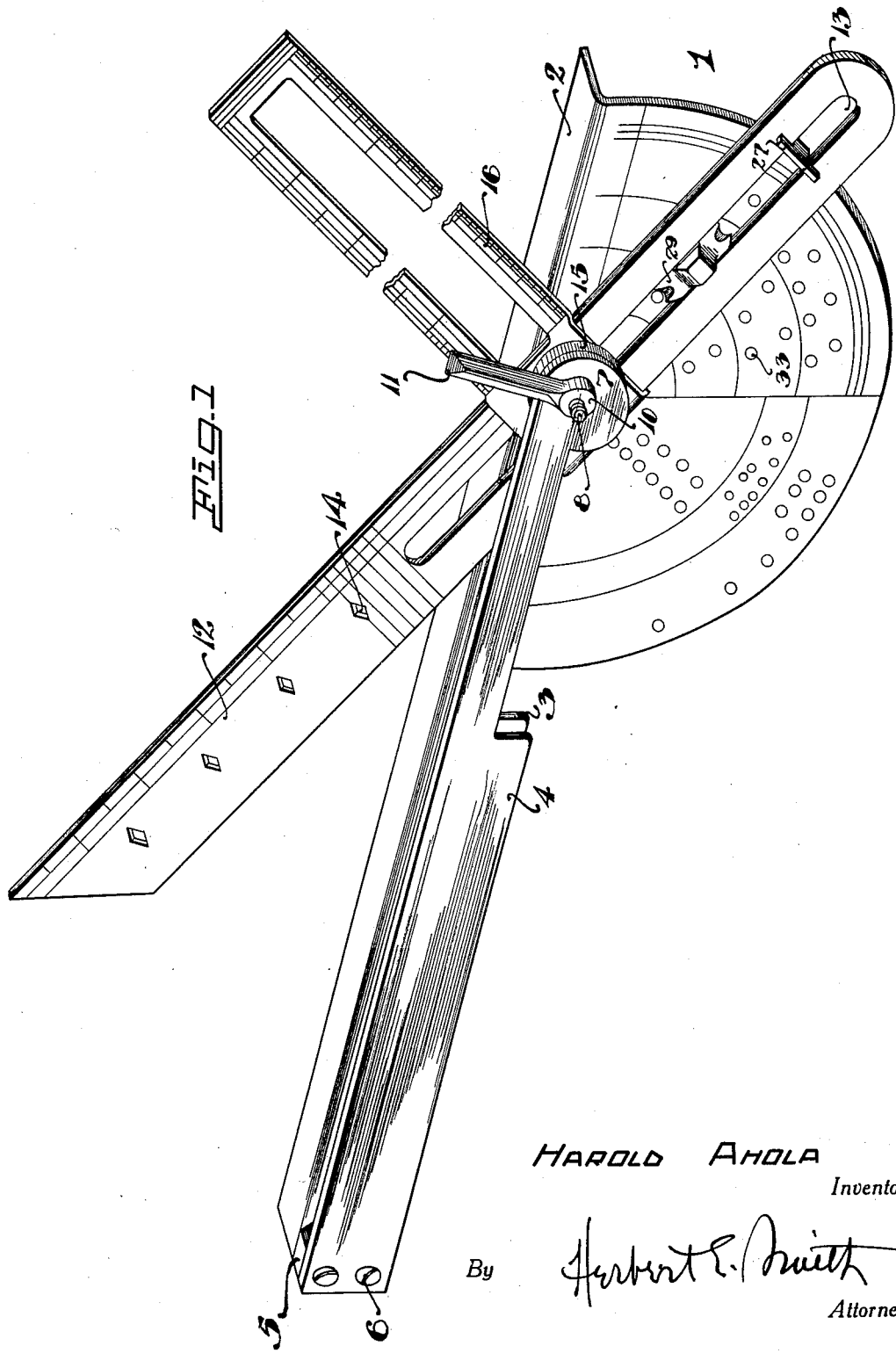

1,947,448

UNITED STATES PATENT OFFICE 1,947,448

BEVEL GAUGE

Harold Ahola, Portland, Oreg., assignor, by mesne assignments, to Technical Tool Company, Portland, Oreg., a corporation of Oregon Application April 26, 1932. Serial No. 607,527

4 Claims. (Cl. 33—94)

REISSUED

My present invention relates to an improved bevel gauge adapted for use as a mitering square, measuring instrument, and for various other purposes, by carpenters, joiners, and others, as for instance in laying out angles for cutting rafters for the roof frames of buildings.

The instrument of my invention is of the straight edge type employing a pivoted, slidable, blade or ruler, that is adjustable on an arcuate data plate for use in combination with the straight edge which is rigid with the data plate. One of the novel features of my invention resides in the use of a demountable and reversible, right-angle arm mounted rigidly on the pivoted blade for use in laying out right-angles, adapted for use at either side of the blade, and also adapted to be folded, with the blade, into compact relationship with the data plate and straight edge, when the pivoted members are out of use. Means are provided for retaining the adjustable parts in adjusted position for use as will be described, and means are provided for setting the pivoted blade and arm, forming the angle, with relation to the data on the plate; and the arcuate plate, which forms the base for the straight edge, as well as the blade or ruler and the right-angle arm, are provided with scales, tables, graduations, and other data for computations and measuring while the instrument is in use.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a perspective view of the instrument embodying my invention, with the angle in position for laying off a right angle with relation to the straight edge.

Figure 2 is a plan view of the instrument, with the parts in substantially the same positions as Figure 1, but with the instrument reversed, and showing the side opposite to that of Figure 1.

Figure 3 is a perspective view of the lock nut; Figure 4 shows a washer; Figure 5 shows the attaching end of the angle-arm; Figure 6 shows a portion of the slotted blade or ruler; Figure 7 shows a locking washer; Figure 8 shows the slotted guide-arm; Figure 9 shows the locking bolt; and Figure 10 shows the slide used in setting the instrument in connection with the guide arm.

In carrying out my invention I preferably utilize an arcuate or semi-circular plate 1 adapted to display 180 degrees of a circle and provided, on both sides with measurements and data for use in connection with the instrument, and this plate is fashioned with a flange 2 that forms the straight edge, and with an additional, shorter flange 3, the latter in the same plane with the plate 1. A side arm 4, complementary to the flange 3 is made rigid with the straight edge by the use of a filler block 5 between the flange and the arm, and screws 6 are used to secure these three members together at the free end of the straight edge.

The plate, straight edge, block, and side arm thus form a frame, with a slot, for the pivoted, adjustable parts of the instrument, and one end of the side arm is provided with a perforated head 7 for the clamp bolt 8, which passes through this head and through a hole in the data plate, and forms the pivot for the adjustable parts. The bolt is fashioned with a head 9 at one end, and the lock nut 10 is threaded on the opposite end of the bolt and provided with a lever-handle 11.

The flat, pivoted blade 12 is fashioned with a longitudinally extending slot 13, extending from one end to approximately its center, and the bolt passes through this slot in order that the blade may be adjusted longitudinally on the bolt, or swung about the bolt as a center. The solid portion of the blade is provided with a series of spaced holes 14, set at predetermined distances, and of diamond shape to accommodate the usual flat point of a carpenter's pencil. With these holes set equidistant apart, it will be apparent that the blade may be turned perpendicular to the straight edge, the blade may be slid along the bolt 8 until it is equidistant from the adjoining hole 14 to the straight edge, and then four marks may be made in the four holes to be used as guides in drawing four lines parallel with the straight edge. Or, the blade may be turned to position of Figure 1 so that the first hole 14 is one-half the distance from the straight edge to hole number 2; one-third the distance to hole number 3 and one-fourth the distance to hole number 4. In this position, the straight edge 2 is laid along the edge of a board or plank, and the holes are used as guides for marking dots on the board, after which the dots are employed as guides in drawing three parallel lines for use, as in ripping a board into three or four strips of the same width.

A washer 15 is used under the nut 10 on the bolt for engagement with a part of the angle arm 16 which is mounted on the blade, and, together with the blade forms a T-head, adapted to be swung about the bolt as a pivot, and in addition, this angle-arm may be swung on the bolt as a center to position parallel with the blade, or the arm may be swung through an arc of 180 degrees from the position of Figure 1, at right angles to the other side of the blade. When swung parallel with the blade, the blade and the arm may then be swung into the slot between the flange 3 and side arm 4, out of the way and in compact condition for storing or transportation.

For the purpose of rigidly mounting the angle arm on the blade, the former is provided at one end with an off-set head 17, which is provided at its extremity with a flange 18, and at the joint of the head with the angle arm, a shoulder 19 is fashioned. The shoulder and the flange are adapted to fit over the opposite side edges of the blade when the latter is positioned perpendicular to the blade, and as best seen in Figure 5 the head 17 is fashioned with a pair of diametrically arranged, side notches 20, and a pair of diametrically arranged, square holes 21, spaced about the center bolt hole in the head of the angle arm.

At the side of the slotted blade opposite the head of the angle arm a washer 23 is mounted on the bolt, and this washer has a pair of centering and retaining lugs 23 on one of its sides that project through the slot 13 of the blade 12. In Figures 1 and 2 with the arm perpendicular to the blade, these lugs project through slot 13 into the side notches 20 of the arm; while the arm is turned parallel with the blade, these lugs engage in the pair of holes 21; and when the arm is turned to the other side of, and perpendicular to the blade, the lugs also engage the pair of notches 20 of the arm. In this manner, regardless of the relative positions of the blade and the arm, they are rigidly held together, and adapted for pivotal edjustment on the bolt, as a rigid T-head, for use in laying off right-angles in various positions and for numerous purposes.

A radially extending guide arm 24 having a longitudinal slot 25, and a bolt hole 26, is mounted on the bolt next to the lock washer 22, and this guide arm, which is mounted on the bolt at the side of the plate 1 opposite to the blade 12, is connected with the blade and movable therewith as the blade is swung on its pivot, but not longitudinally movable with relation to the pivot bolt.

At its free, outer end the guide arm is fashioned with an angular T-head 27 and side notches 28, the T-head being projected across the edge of the plate 1 and projected through the slot 13 of the blade, while the side notches 28 of the T-head form guides for the walls of the slot 13 in the blade. Thus, the blade is free of the guide arm for its longitudinal adjustment with relation to the bolt and the guide arm, and the guide arm is utilized for assisting in pivotal adjustment of the blade, or the T-head composed of the blade and angle-arm.

A setting device, or slide 29, having a thumb-knob 30, and slide-grooves 31 is mounted on the slotted blade 12 at one side of the instrument, and another slide is mounted on the slotted guide arm 24 at the opposite side of the instrument, and slidable in the respective slots 13 and 25. At opposite ends the slide 29 is fashioned with guide grooves 32 between the walls of its guide slot, and these grooves may be used to guide a centering tool or point to a socket or recess as 33, of which a number are illustrated on both sides of data plate 1, and by which a desired position may be ascertained for the blade 12, or the T-head. When the desired point is attained, the thumb bolt 9 or the nut-lever 11 is turned to clamp the instrument in adjusted position.

The setting device or slide frictionally engages the slotted member on which it is mounted, and is thereby guided in its adjusting movement, toward or away from the pivot bolt, and for co-action with one of a number of sockets or recesses, in the pivotal adjustment of the blade, or of the T-head.

The sockets or recesses in opposite faces of the data plate may be arranged in any suitable or appropriate manner, as for instance in Figure 1 the sockets are shown in arcuate spaces between concentric lines and a radial spacing line, while in Figure 2 the sockets or recesses are shown in segmental spaces between radiating lines, and in both instances, the sockets are located in predetermined poitions for accurate use with the necessary data employed for setting the blade or the tri-angle.

In Figure 2 the instrument is shown as equipped with a spirit level 34 attached at the underside of the straight edge or flange 2, for use in connection with the measuring instrument or gauge, and it will be apparent that other alterations and changes may be made in the exemplified structure, within the scope of my claims, without departing from the principles of my invention.

Having thus fully described my invention, what I claim as new and desire to secure by Letters Patent is:—

1. The combination with a data plate having sockets in its face and an integral straight edge, of a pivoted adjustable blade at one side of the plate, a detachable angle-arm rigidly mounted on the blade to form a T-head, a guide arm at the other side of the plate, a pivot bolt passing through said plate, blade, angle-arm and guide-arm, means for clamping said members on the bolt, and a setting-slide mounted on said guide arm for use with said sockets.

2. In a device as described, the combination with a pivoted, slotted blade and clamping bolt, of an angle arm having an offset head and two pairs of diametrically arranged openings in said head, a supporting plate, a washer mounted on the bolt between said plate and the slotted blade, and a pair of locking lugs on said washer adapted for alternate use with the two pairs of openings in said head.

3. In a measuring instrument of the straight edge type including a data plate having sockets in its opposite faces and an integral straight edge, the combination of a slotted blade, a demountable angle arm having an attaching head, said head having two pairs of diametrically arranged openings, a washer having a pair of lugs projecting through the slotted blade for alternate use with said pairs of openings, a radially disposed, slotted, guide arm at the side of the plate opposite to that of the slotted blade, a clamp bolt for these members, and duplicate slide-gauges mounted on the slotted blade and slotted guide arm for use with the sockets in the opposite faces of the plate.

4. In a bevel gauge of the straight edge type, the combination with a data plate having an angular flange to form a straight edge and a second flange in the plane of the plate, and a side arm spaced from and rigid with the second flange, of a slotted blade pivoted to fit between said second flange and side arm, a detachable angle arm rigidly mounted on the blade to form a T-head, a pivot bolt passing through the plate, blade, side arm, and angle arm, and means for clamping said members on the bolt.

HAROLD AHOLA.